United States Patent
Horn et al.

(10) Patent No.: US 11,979,900 B2
(45) Date of Patent: May 7, 2024

(54) UPLINK REFERENCE SIGNAL PERIODICITY

(71) Applicant: QUALCOMM Incorporated, San Diego, CA (US)

(72) Inventors: Idan Michael Horn, Hod Hasharon (IL); Jacob Pick, Beit Zait (IL); Assaf Touboul, Netanya (IL); Shay Landis, Hod Hasharon (IL); Shlomit Shaked, Beer Sheva (IL)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/353,340

(22) Filed: Jun. 21, 2021

(65) Prior Publication Data
US 2022/0408444 A1 Dec. 22, 2022

(51) Int. Cl.
*H04W 72/563* (2023.01)
*H04L 5/00* (2006.01)
*H04W 72/044* (2023.01)
*H04W 72/21* (2023.01)

(52) U.S. Cl.
CPC .......... *H04W 72/563* (2023.01); *H04L 5/0051* (2013.01); *H04W 72/0473* (2013.01); *H04W 72/21* (2023.01)

(58) Field of Classification Search
CPC ............... H04W 72/563; H04W 72/21; H04W 72/0473
See application file for complete search history.

(56) References Cited

U.S. PATENT DOCUMENTS

| | | | | |
|---|---|---|---|---|
| 2018/0206132 | A1* | 7/2018 | Guo | H04B 7/0695 |
| 2019/0081751 | A1* | 3/2019 | Miao | H04B 7/0619 |
| 2020/0112926 | A1* | 4/2020 | Laghate | H04B 7/0404 |
| 2020/0373987 | A1* | 11/2020 | Noh | H04B 7/0628 |
| 2021/0367727 | A1* | 11/2021 | Go | H04L 5/0048 |

* cited by examiner

*Primary Examiner* — Basil Ma
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit an indication of a requested periodicity for uplink reference signals associated with improving UE power efficiency. The UE may receive an indication of resources for transmitting uplink reference signals based at least in part on the requested periodicity. Numerous other aspects are described.

30 Claims, 8 Drawing Sheets

UPLINK REFERENCE SIGNAL PERIODICITY

FIELD OF THE DISCLOSURE

Aspects of the present disclosure generally relate to wireless communication and to techniques and apparatuses for user equipment-requested uplink reference signal periodicity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication of a requested periodicity for uplink reference signals associated with improving UE power efficiency. The method may include receiving an indication of resources for transmitting uplink reference signals based at least in part on the requested periodicity.

Some aspects described herein relate to a method of wireless communication performed by a base station. The method may include receiving an indication of a requested periodicity for uplink reference signals associated with improving UE power efficiency. The method may include transmitting an indication of resources for transmitting uplink reference signals based at least in part on the requested periodicity.

Some aspects described herein relate to a UE for wireless communication. The user equipment may include a memory and one or more processors coupled to the memory. The one or more processors may be configured to transmit an indication of a requested periodicity for uplink reference signals associated with improving UE power efficiency. The one or more processors may be configured to receive an indication of resources for transmitting uplink reference signals based at least in part on the requested periodicity.

Some aspects described herein relate to a base station for wireless communication. The base station may include a memory and one or more processors coupled to the memory. The one or more processors may be configured to receive an indication of a requested periodicity for uplink reference signals associated with improving UE power efficiency. The one or more processors may be configured to transmit an indication of resources for transmitting uplink reference signals based at least in part on the requested periodicity.

Some aspects described herein relate to a non-transitory computer-readable medium that stores a set of instructions for wireless communication by a UE. The set of instructions, when executed by one or more processors of the UE, may cause the UE to transmit an indication of a requested periodicity for uplink reference signals associated with improving UE power efficiency. The set of instructions, when executed by one or more processors of the UE, may cause the UE to receive an indication of resources for transmitting uplink reference signals based at least in part on the requested periodicity.

Some aspects described herein relate to a non-transitory computer-readable medium that stores a set of instructions for wireless communication by a base station. The set of instructions, when executed by one or more processors of the base station, may cause the base station to receive an indication of a requested periodicity for uplink reference signals associated with improving UE power efficiency. The set of instructions, when executed by one or more processors of the base station, may cause the base station to transmit an indication of resources for transmitting uplink reference signals based at least in part on the requested periodicity.

Some aspects described herein relate to an apparatus for wireless communication. The apparatus may include means for transmitting an indication of a requested periodicity for uplink reference signals associated with improving UE power efficiency. The apparatus may include means for receiving an indication of resources for transmitting uplink reference signals based at least in part on the requested periodicity.

Some aspects described herein relate to an apparatus for wireless communication. The apparatus may include means for receiving an indication of a requested periodicity for uplink reference signals associated with improving UE power efficiency. The apparatus may include means for transmitting an indication of resources for transmitting uplink reference signals based at least in part on the requested periodicity.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
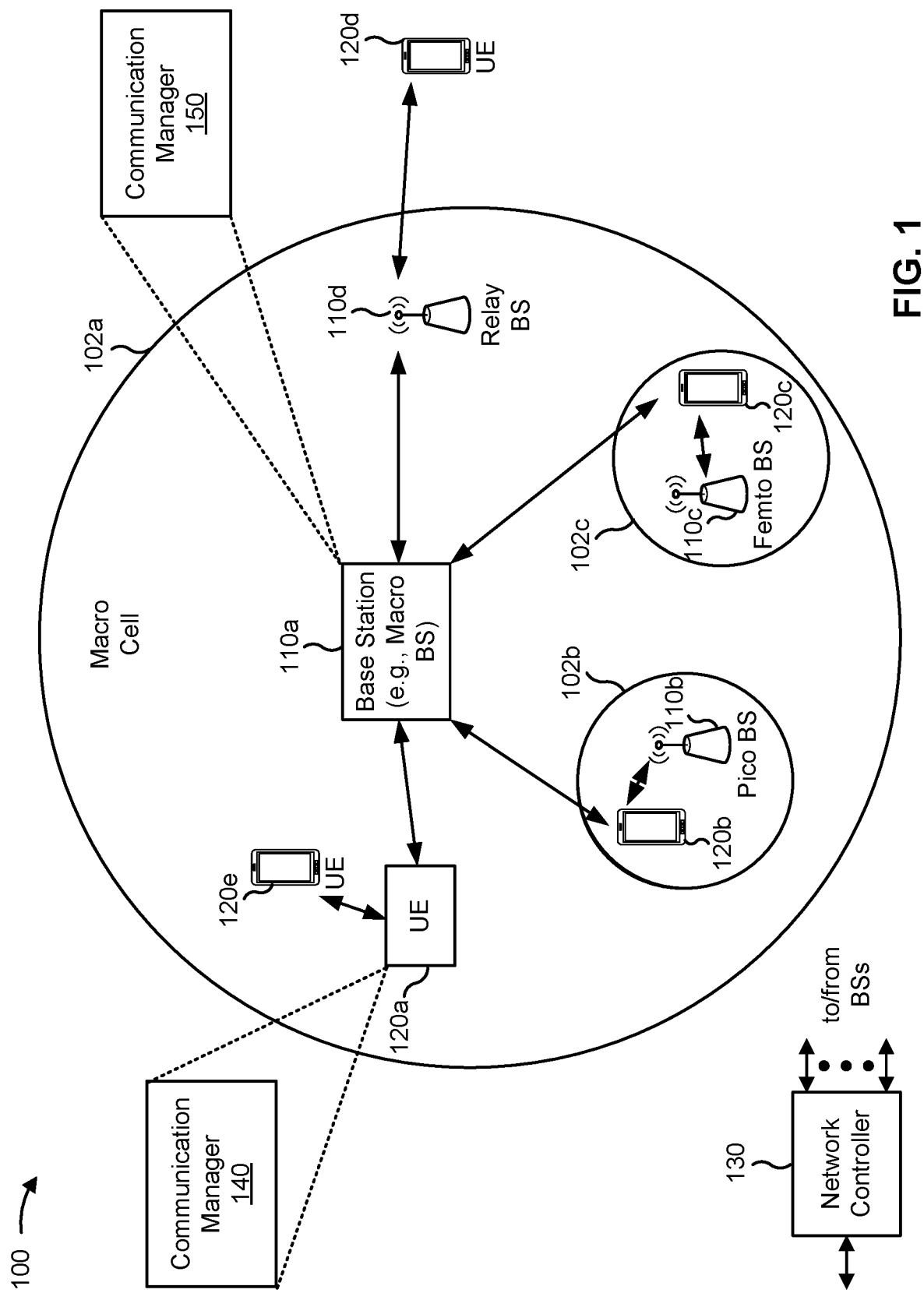
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication of a requested periodicity for uplink reference signals associated with improving UE power efficiency, and receive an indication of resources for transmitting uplink reference signals based at least in part on the requested periodicity. Additionally, or alternatively, the communication manager 140 may perform one or more other operations described herein.

In some aspects, the base station 110 may include a communication manager 150. As described in more detail elsewhere herein, the communication manager 150 may receive an indication of a requested periodicity for uplink reference signals associated with improving UE power efficiency, and transmit an indication of resources for transmitting uplink reference signals based at least in part on the requested periodicity. Additionally, or alternatively, the communication manager 150 may perform one or more other operations described herein.

As indicated above, FIG. 1 is provided as an example. Other examples may differ from what is described with regard to FIG. 1.

Figure 2:
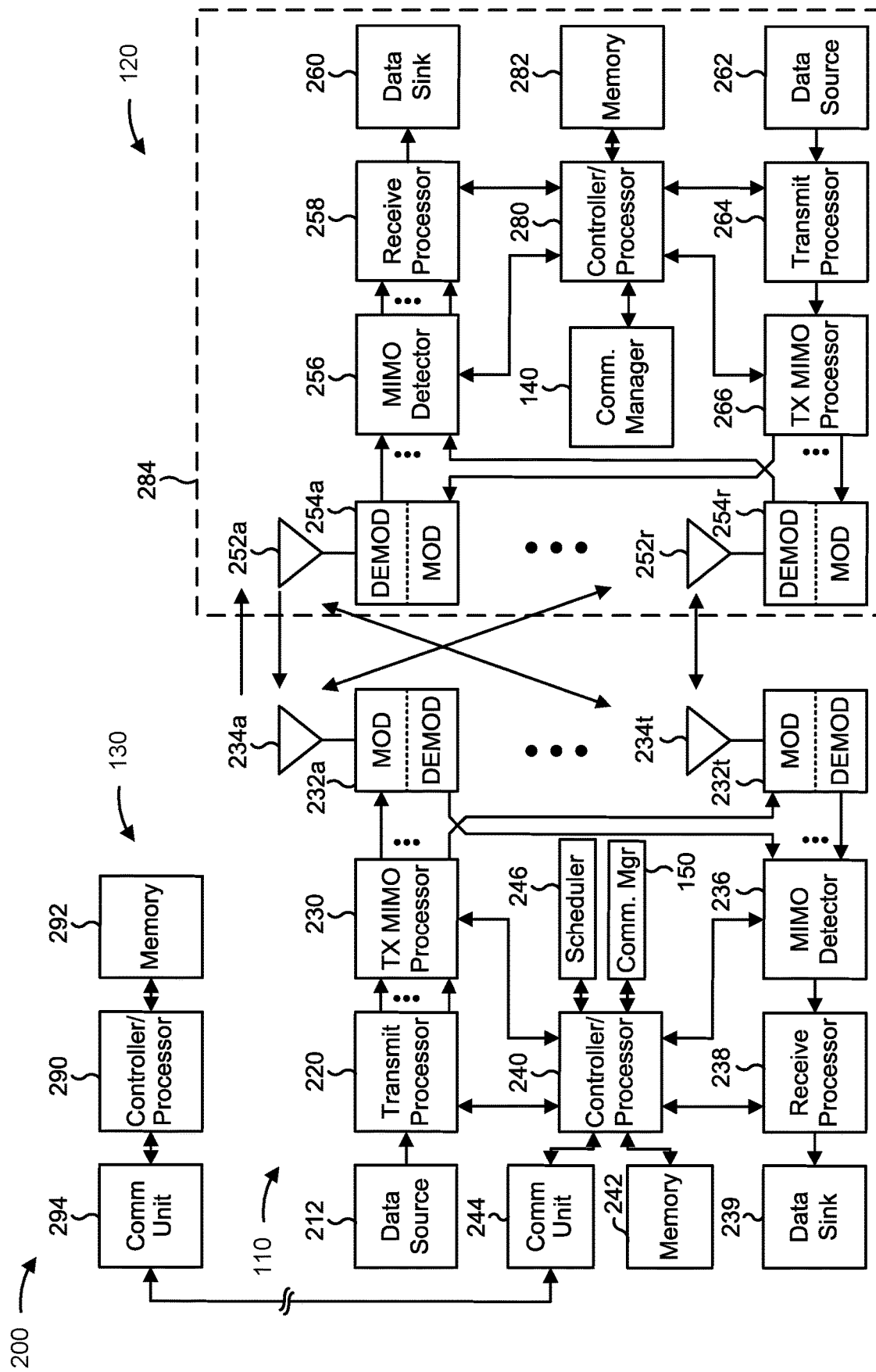
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with UE-requested uplink reference signal periodicity, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for transmitting an indication of a requested periodicity for uplink reference signals associated with improving UE power efficiency; and/or means for receiving an indication of resources for transmitting uplink reference signals based at least in part on the requested periodicity. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving an indication of a requested periodicity for uplink reference signals associated with improving UE power efficiency; and/or means for transmitting an indication of resources for transmitting uplink reference signals based at least in part on the requested periodicity. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
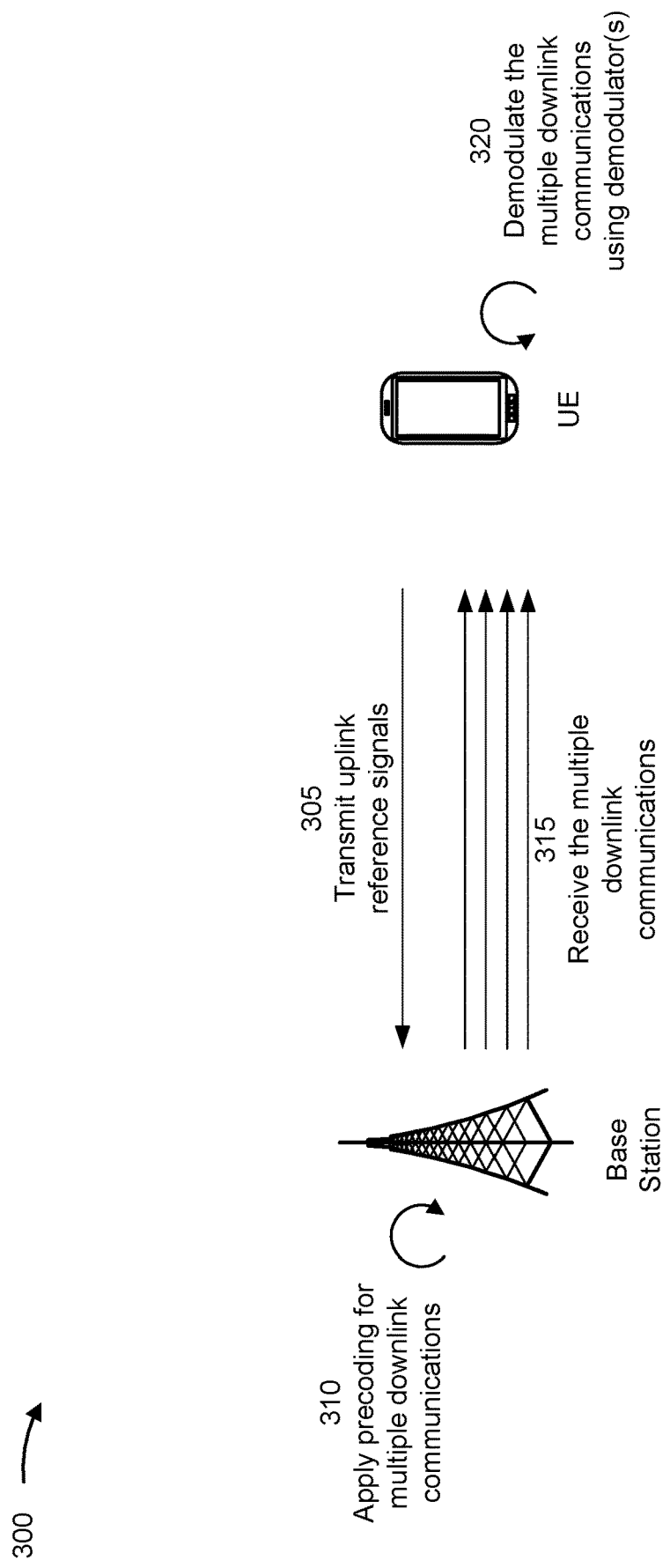
FIG. 3 is a diagram illustrating an example of applying precoding for downlink communications, in accordance with the present disclosure.

FIG. 3 is a diagram illustrating an example 300 of applying precoding for downlink communications, in accordance with the present disclosure. As shown in FIG. 3, a UE and a base station may communicate via a wireless network. The UE and the base station may have previously established a connection. The base station may have previously configured resources for the UE to transmit uplink reference signals, such as sounding reference signals (SRSs) to the base station for the base station to estimate an uplink channel. The base station may have determined, or may have been configured to rely upon, channel reciprocity between an uplink and a downlink channel.

As shown by reference number 305, the UE may transmit, and the base station may receive, uplink reference signals. The UE may transmit the uplink reference signals using resources allocated by the base station. The uplink reference signals may include signaling that is transmitted over multiple frequencies (e.g., tones) associated with an uplink channel and/or a downlink channel.

As shown by reference number 310, the base station may apply precoding for multiple downlink communications based at least in part on the uplink reference signals. For example, the base station may estimate an uplink channel based at least in part on the uplink reference signals and assume reciprocity between the uplink channel and the downlink channel. The precoding may be applied to account for the downlink channel, as estimated based at least in part on the uplink reference signals. For example, the precoding may be configured to improve interlayer separation between multiple layers of the downlink channel.

As shown by reference number 315, the UE may receive, and the base station may transmit, the multiple downlink communications having the precoding applied. The base station may use the precoding for all downlink communications until receiving a new set of uplink reference signals for updating an estimate of the uplink channel and/or the downlink channel. However, as time elapses between the base station receiving the uplink reference signals and transmission of a downlink communication, the channel may change, which may negatively affect interlayer separation based at least in part on using the precoding.

As shown by reference number 320, the UE may demodulate the multiple downlink communications using one or more demodulators. For example, the UE may use a minimum mean square estimation (MMSE) demodulator (e.g., an MMSE demodulator module) if a downlink communication has relatively low cross-layer leakage (e.g., relatively high interlayer separation). The UE may use a maximum likelihood (ML) estimator (e.g., an ML estimator demodulator module) even if the downlink communication has a relatively high cross-layer leakage (e.g., a relatively low interlayer separation). However, the MMSE demodulator is less complex, and uses less power, than the ML estimator. In other words, using the ML estimator instead of the MMSE demodulator may consume increased computing and power resources of the UE.

In some aspects described herein, a UE may transmit an indication of a requested periodicity for uplink reference signals (e.g., SRSs) associated with improving UE power efficiency. For example, the requested periodicity may be determined by the UE to increase a likelihood of demodulating downlink communications using a low-complexity demodulator (e.g., with a performance that accounts for decoder power consumed to decode a demodulation of the downlink communications produced by the low-complexity demodulator). The requested periodicity may increase the likelihood of demodulating and decoding downlink communications using the lower complexity demodulator based at least in part on providing the uplink reference signals at a periodicity that improves accuracy of a downlink channel estimate (e.g., made by the base station using reciprocity of an uplink channel estimate), which may improve precoding accuracy for the downlink communications. Improved precoding accuracy for the downlink communications may improve interlayer separation between layers of the downlink communications, which may reduce interlayer leakage (e.g., cross-layer leakage) and improve demodulation using a less-complex demodulator, such as an MMSE demodulator.

In some aspects, the UE may determine the requested periodicity based at least in part on overhead associated with transmitting the uplink reference signals with the requested periodicity, UE power efficiency (e.g., for a demodulator and/or a decoder), and performance (e.g., bits per Joule used to demodulate and decode the downlink communications). In some implementations, the periodicity may be associated with an integer number of slots between transmissions of uplink reference signals.

The UE may select the preferred periodicity based at least in part on UE demodulator performances (e.g., which may be based at least in part on base station precoding accuracy and/or quality for reducing self layers leakage (e.g., cross-layer leakage) as observed by the UE), channel Doppler spread (e.g., changes to the channel response during consecutive slots), signal-based metrics such as signal-to-interference-plus-noise ratio (SINR) and/or RSRP (e.g., if high SINR or RSRP is needed for the low-complexity demodulator, the UE power efficiency may be improved with a small periodicity), a change in downlink rank that is used and/or reported, decoder power consumption for different demodulators, overhead of the uplink reference signals, a handover, and/or a beam change, among other examples.

In some implementations, the UE may trigger an aperiodic request for a change and/or update to a periodicity. For example, the UE may trigger the aperiodic request based at least in part on a degradation in power efficiency (e.g., associated with demodulating and/or decoding downlink communications), which may be based at least in part on an outdated, inaccurate, and/or stale channel estimate and/or precoding.

In some aspects, the UE may transmit an indication of support for indicating the requested periodicity. For example, the UE may transmit the indication of support in a message associated with a connection establishment process, such as in a capabilities report.

In some aspects, the UE may transmit an indication of supported demodulators of the UE and associated power consumption. The UE may also transmit an indication of performance of the supported demodulators associated with delay spreads, Doppler spreads, ranks, constellations, and/or coding rates, among other examples, associated with different interlayer separation precoding (e.g., singular value decomposition (SVD)-based precoding). The base station may estimate a periodicity for the uplink reference signals based at least in part on the indication of the supported demodulators and the associated port consumption and/or the indication of performance to optimize UE power efficiency and/or overhead associated with transmitting the uplink reference signals. The indication of the requested periodicity for the uplink reference signals may include, or may consist of, the indication of the supported demodulators and the associated port consumption and/or the indication of performance.

Based at least in part on the UE transmitting an indication of a requested periodicity for uplink reference signals associated with improving UE power efficiency, the base station may allocate resources for transmission of the uplink reference signals with a periodicity that improves the UE power efficiency. For example, transmission of the uplink reference signals with the periodicity may optimize a period for updating a downlink channel estimate (e.g., based at least in part on an estimate of an uplink channel) and/or precoding for downlink communications to improve demodulation by the UE using a low-complexity demodulator, which may conserve power and/or computing resources of the UE that may otherwise be consumed by using a high-complexity demodulator and/or decoding signals that were inaccurately demodulated using the low-complexity demodulator.

Figure 4:
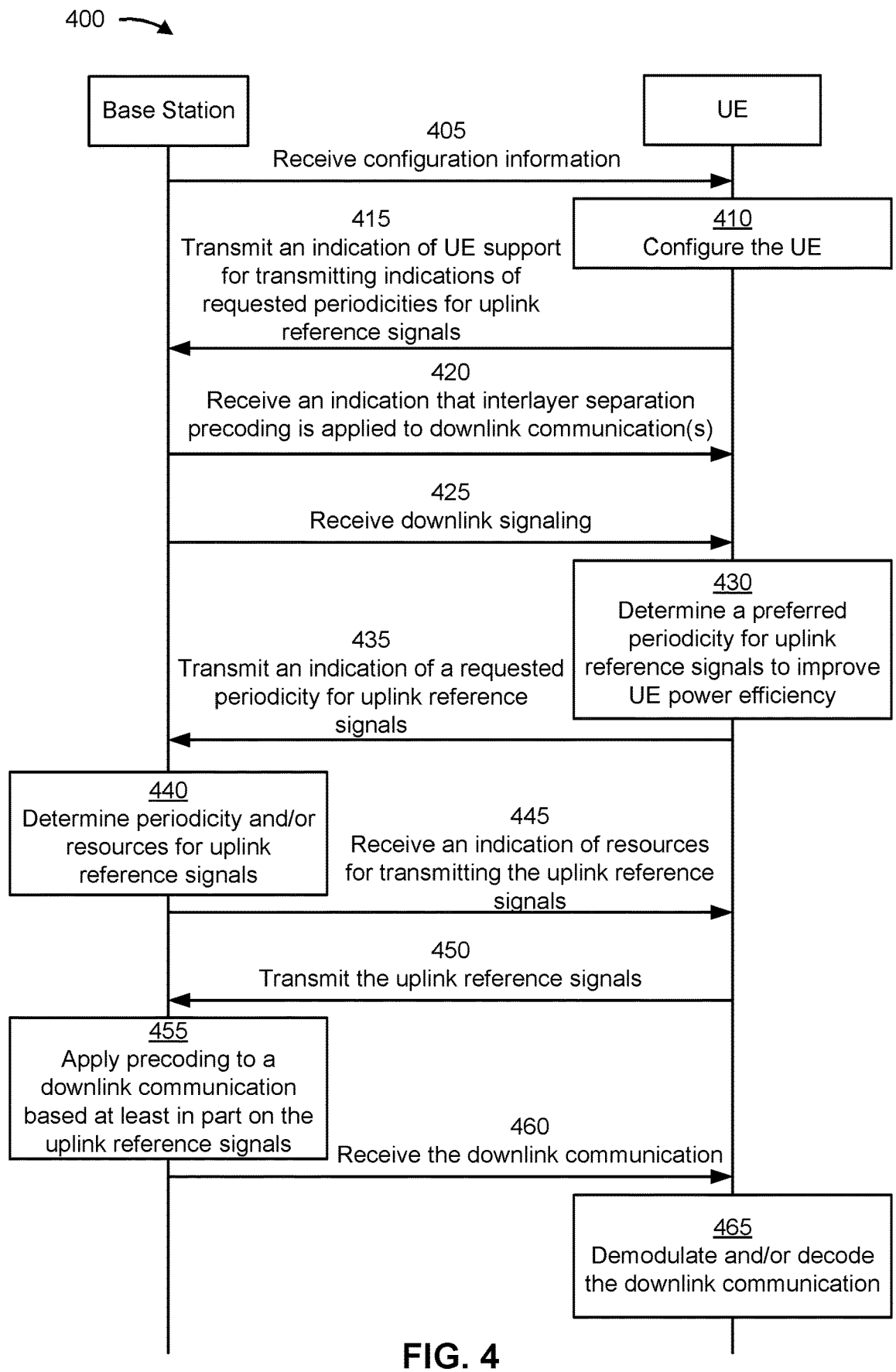
FIG. 4 is a diagram illustrating an example associated with user equipment-requested uplink reference signal periodicity, in accordance with the present disclosure.

FIG. 4 is a diagram illustrating an example 400 associated with user equipment-requested uplink reference signal periodicity, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may communicate via one or more multi-layered communication channel.

As shown by reference number 405, the base station may transmit, and the UE may receive, configuration information. In some aspects, the UE may receive the configuration information via one or more of radio resource control (RRC) signaling, medium access control (MAC) control elements (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of UE support for transmitting indications of requested periodicities for reference signals. In some aspects, the configuration information may indicate that the UE is to transmit the indications of requested periodicities to the base station. In some aspects, the configuration information may indicate a configuration for how the UE may transmit the indications of requested periodicities.

As shown by reference number 410, the UE may configure the UE based at least in part on the configuration information. In some aspects, the UE may be configured to perform one or more operations described herein based at least in part on the configuration information.

As shown by reference number 415, the UE may transmit, and the base station may receive, an indication of UE support for transmitting an indication of a requested periodicity for uplink reference signals. The indication of UE support for transmitting the indication of the requested periodicity for uplink reference signals may be associated with improving UE power efficiency. In some aspects, the UE may transmit the indication of UE support in an RRC message (e.g., as part of an RRC configuration process, among other examples). In some aspects, the UE may transmit the indication of UE support within one or more MAC CEs and/or within a physical uplink control channel (PUCCH) communication. For example, the UE may transmit the indication of UE support based at least in part on the UE detecting a denigration of UE power efficiency in prior downlink communications. In some aspects, the uplink reference signals may include SRSs and/or other reference signals configured for the base station to use for channel estimation.

As shown by reference number 420, the UE may receive, and the base station may transmit, an indication that interlayer separation precoding is applied to one or more downlink communications. For example, the indication that interlayer separation precoding is applied may include an indication of the type of interlayer separation precoding, such as singular value decomposition (SVD).

As shown by reference number 425, the UE may receive downlink signaling. In some aspects, the UE may determine one or more metrics associated with the downlink channel and/or one or more downlink communications based at least in part on the downlink signaling. For example, the UE may determine an SINR and/or an RSRP, a Doppler spread, and/or interference between layers, among other examples associated with the downlink channel. In some aspects, the UE may determine power efficiency of various demodulators, decoders, and/or demodulator-decoder pairs associated with downlink communications.

As shown by reference number 430, the UE may determine a preferred periodicity for uplink reference signals to improve UE power efficiency. In some aspects, the UE power efficiency is based at least in part on power consumption and performance of one or more UE decoders and/or UE decoders. For example, the periodicity may be based at least in part on a loss of power efficiency that is expected to occur if a channel estimate is stale and/or inaccurate. In some aspects, the power efficiency may be based at least in part on an amount of power consumption expected based at least in part on the precoding, that is based at least in part on a stale channel estimate, having inaccuracies that require a high-complexity demodulator, and/or that causes a demodulator to consume an increased amount of power resources based at least in part on low-quality demodulation.

In some aspects, the preferred periodicity may be based at least in part on UE demodulator performance (e.g., based at least in part on power consumption and/or accuracy of demodulation, among other examples), UE decoder power consumption (e.g., based at least in part on power consumption and/or accuracy of decoding, among other examples) associated with one or more UE demodulators, a channel Doppler spread associated with the downlink channel, an SINR associated with the downlink channel, an RSRP associated with the downlink channel, a rank of a subsequent downlink communication, and/or overhead of the uplink reference signals at the preferred periodicity. In some aspects, the preferred periodicity may be based at least in part on a physical resource block group (PRG) size. For example, for a relatively large PRG size, a low-complexity demodulator may be less effective at separating interlayer interference based at least in part on averaging over more resource blocks, but may also receive a downlink communication with additional pilots, which may improve channel estimation. In some aspects, the UE may optimize power efficiency (e.g., bits per Joule) and/or spectrum efficiency (e.g., including overhead for the uplink reference signals) for various periodicities.

As shown by reference number 435, the UE may transmit, and the base station may receive, an indication of a requested periodicity (e.g., the preferred periodicity) for uplink reference signals. In some aspects, the UE may transmit the requested periodicity based at least in part on a change to a channel and/or an indication of a change to subsequent communications. For example, the UE may transmit the requested periodicity based at least in part on a change of a rank indicated for a subsequent downlink communication, a handover, a degradation of power efficiency in a demodulator or decoder, and/or a beam change.

In some aspects, the UE may transmit the indication of the requested periodicity via an aperiodic report (e.g., based at least in part on the UE detecting a change that may reduce power efficiency for receiving subsequent downlink communications, among other examples). For example, the UE may transmit a request to update a periodicity, to shorten a periodicity, or to lengthen a periodicity based at least in part on a change detected by the UE. In some aspects, the UE may transmit the indication of the requested periodicity via a periodic report. For example, the base station may provide a configured set of resources, with a periodicity, in which the UE may transmit the indication of the requested periodicity.

The UE may transmit the indication of the requested periodicity via a physical uplink shared channel (PUSCH), uplink control information (UCI), and/or a channel state feedback (CSF) report. In some aspects, the base station may configure a format for the UE to use the PUSCH, the UCI, and/or the CSF report to indicate the requested periodicity.

In some aspects, the indication of the requested periodicity may include an explicit indication of the requested periodicity. For example, the indication may indicate a number of time domain resources (e.g., slots) between transmitting consecutive uplink reference signals. In some aspects, the indication of the requested periodicity may include an indication of a relative change of periodicity from a previously observed periodicity. For example, the indication may indicate to decrease the periodicity or to decrease the periodicity of the previously observed periodicity. In some aspects, the previously observed periodicity may be based at least in part on an average time between consecutive prior transmission of reference signals over a time period. In some aspects, the time period may be configured by the base station or may be indicated in a communication protocol associated with the wireless network.

As shown by reference number 440, the base station may determine periodicity and/or resources for uplink reference signals associated with the UE. In some aspects, the indication of the resources for transmitting the uplink signals may be based at least in part on the requested periodicity. In some aspects, the base station may determine to use a periodicity that is the same periodicity as the requested periodicity. In some aspects, the periodicity may differ from the requested periodicity based at least in part on, for example, traffic with other UEs, interference with other UEs and/or base stations, and/or expected subsequent communications (e.g., timing based at least in part on latency requirements and/or buffered data for transmission, among other examples.

As shown by reference number 445, the UE may receive, and the base station may transmit, an indication of resources for transmitting the uplink reference signals. In some aspects, the base station may transmit the indication of resources for transmitting the uplink reference signals within a dynamic scheduling communication, such as DCI, and/or via a semi-static scheduling communication, such as a semi-static scheduling communication (e.g., an RRC communication and/or an MAC CE).

As shown by reference number 450, the UE may transmit, and the base station may receive, the uplink reference signals. The UE transmits the uplink reference signals using the resources allocated by the base station in connection with reference number 445.

As shown by reference number 455, the base station may apply precoding to a downlink communication based at least in part on the uplink reference signals. In some aspects, the precoding may include an interlayer separation precoding, such as SVD, that is configured based at least in part on a channel estimate of the downlink channel. For example, the base station may estimate the uplink channel based at least in part on the uplink reference signals and use the estimate of the uplink channel to estimate the downlink channel based at least in part on, for example, channel reciprocity. The precoding may be configured to reduce and/or eliminate cross-layer leakage between layers of the downlink communication.

As shown by reference number 460, the UE may receive, and the base station may transmit, the downlink communication. In some aspects, the downlink communication is a multi-layered communication having spatial separation between the multiple layers based at least in part on the base station applying the precoding.

As shown by reference number 465, the UE may demodulate and/or decode the downlink communication. In some aspects, the UE may attempt to demodulate the downlink communication using the low-complexity demodulator. Based at least in part on the low-complexity demodulator demodulating the downlink communication with sufficient accuracy such that power consumed collectively by the low-complexity demodulator and an associated decoder has an efficiency (e.g., bits per Joule) that is greater than power consumed collectively by the high-complexity demodulator and an associated decoder, the UE will conserve power and/or computing resources.

As indicated above, FIG. 4 is provided as an example. Other examples may differ from what is described with regard to FIG. 4.

Figure 5:
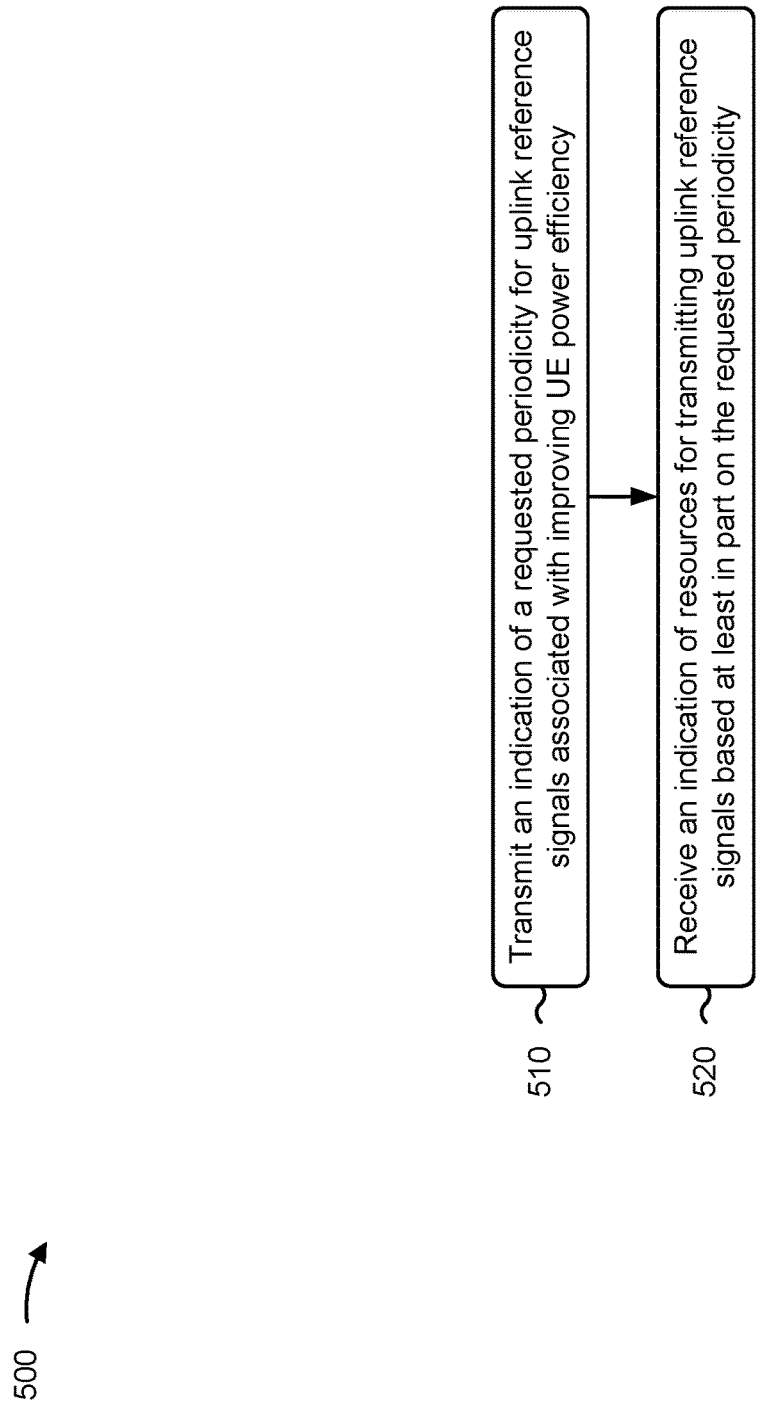
FIGS. 5-6 are diagrams illustrating example processes associated with user equipment-requested uplink reference signal periodicity, in accordance with the present disclosure.

FIG. 5 is a diagram illustrating an example process 500 performed, for example, by a UE, in accordance with the present disclosure. Example process 500 is an example where the UE (e.g., UE 120) performs operations associated with UE-requested uplink reference signal periodicity.

As shown in FIG. 5, in some aspects, process 500 may include transmitting an indication of a requested periodicity for uplink reference signals associated with improving UE power efficiency (block 510). For example, the UE (e.g., using communication manager 140 and/or transmission component 704, depicted in FIG. 7) may transmit an indication of a requested periodicity for uplink reference signals associated with improving UE power efficiency, as described above.

As further shown in FIG. 5, in some aspects, process 500 may include receiving an indication of resources for transmitting uplink reference signals based at least in part on the requested periodicity (block 520). For example, the UE (e.g., using communication manager 140 and/or reception component 702, depicted in FIG. 7) may receive an indication of resources for transmitting uplink reference signals based at least in part on the requested periodicity, as described above.

Process 500 may include additional aspects, such as any single aspect or any combination of aspects described below and/or in connection with one or more other processes described elsewhere herein.

In a first aspect, the uplink reference signals comprise SRSs.

In a second aspect, alone or in combination with the first aspect, the UE power efficiency is based at least in part on power consumption and performance of a UE demodulator.

In a third aspect, alone or in combination with one or more of the first and second aspects, the UE power efficiency is based at least in part on power consumption and performance of a UE decoder.

In a fourth aspect, alone or in combination with one or more of the first through third aspects, process 500 includes transmitting an indication of UE support for transmitting the indication of the requested periodicity for uplink reference signals associated with improving UE power efficiency.

In a fifth aspect, alone or in combination with one or more of the first through fourth aspects, transmitting the indication of UE support for transmitting the indication of the requested periodicity for uplink reference signals associated with improving UE power efficiency comprises transmitting the indication of UE support via an RRC message.

In a sixth aspect, alone or in combination with one or more of the first through fifth aspects, process 500 includes receiving an indication that interlayer separation precoding is applied to a downlink communication.

In a seventh aspect, alone or in combination with one or more of the first through sixth aspects, the interlayer separation precoding comprises SVD.

In an eighth aspect, alone or in combination with one or more of the first through seventh aspects, the requested periodicity is based at least in part on one or more of UE demodulator performance, UE decoder power consumption associated with one or more UE demodulators, channel Doppler spread, an SINR, an RSRP, a rank of a subsequent downlink communication, or overhead of the uplink reference signals at the requested periodicity.

In a ninth aspect, alone or in combination with one or more of the first through eighth aspects, transmitting the requested periodicity is based at least in part on one or more of a change of a rank indicated for a subsequent downlink communication, a handover, a degradation of power efficiency in a demodulator or decoder, or a beam change.

In a tenth aspect, alone or in combination with one or more of the first through ninth aspects, transmitting the requested periodicity comprises transmitting the requested periodicity via one or more of an aperiodic report, a periodic report, a PUSCH, UCI, or a CSF report.

In an eleventh aspect, alone or in combination with one or more of the first through tenth aspects, the indication of the requested periodicity for uplink reference signals associated with improving UE power efficiency comprises one or more of an indication of a number of time domain resources between transmitting uplink reference signals, or a requested change to a periodicity of prior transmissions of uplink reference signals.

In a twelfth aspect, alone or in combination with one or more of the first through eleventh aspects, the periodicity of prior transmissions of uplink reference signals is based at least in part on an average time between consecutive prior transmissions of the prior transmissions of reference signals over a time period.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
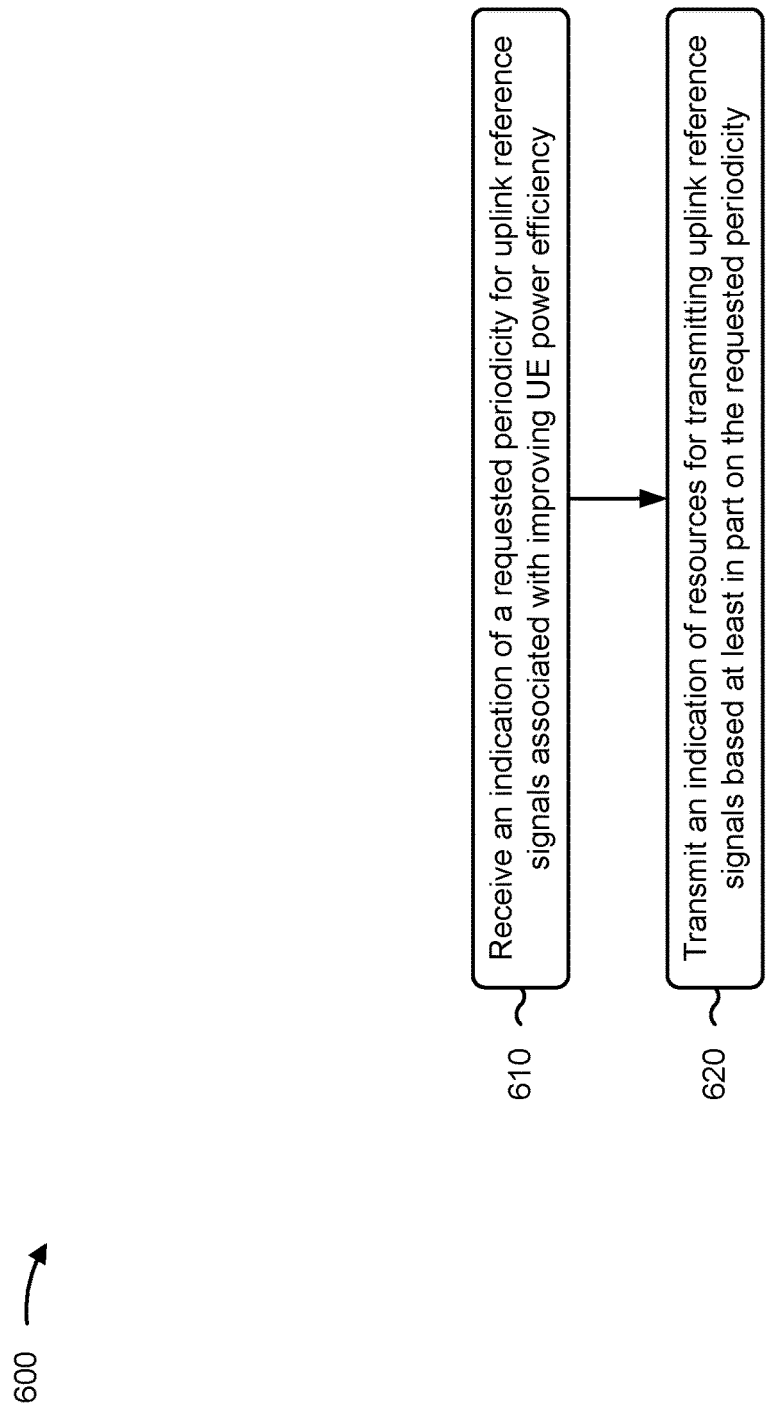

FIG. 6 is a diagram illustrating an example process 600 performed, for example, by a base station, in accordance with the present disclosure. Example process 600 is an example where the base station (e.g., base station 110) performs operations associated with uplink reference signal periodicity.

As shown in FIG. 6, in some aspects, process 600 may include receiving an indication of a requested periodicity for uplink reference signals associated with improving UE power efficiency (block 610). For example, the base station (e.g., using communication manager 150 and/or reception component 802, depicted in FIG. 8) may receive an indication of a requested periodicity for uplink reference signals associated with improving UE power efficiency, as described above.

As further shown in FIG. 6, in some aspects, process 600 may include transmitting an indication of resources for transmitting uplink reference signals based at least in part on the requested periodicity (block 620). For example, the base station (e.g., using communication manager 150 and/or transmission component 804, depicted in FIG. 8) may transmit an indication of resources for transmitting uplink reference signals based at least in part on the requested periodicity, as described above.

Process 600 may include additional aspects, such as any single aspect or any combination of aspects described below and/or in connection with one or more other processes described elsewhere herein.

In a first aspect, the uplink reference signals comprise SRSs.

In a second aspect, alone or in combination with the first aspect, the UE power efficiency is based at least in part on power consumption and performance of a UE demodulator.

In a third aspect, alone or in combination with one or more of the first and second aspects, the UE power efficiency is based at least in part on power consumption and performance of a UE decoder.

In a fourth aspect, alone or in combination with one or more of the first through third aspects, process 600 includes receiving an indication of UE support for transmitting the indication of the requested periodicity for uplink reference signals associated with improving UE power efficiency.

In a fifth aspect, alone or in combination with one or more of the first through fourth aspects, receiving the indication of UE support for transmitting the indication of the requested periodicity for uplink reference signals associated with improving UE power efficiency comprises receiving the indication of UE support via an RRC message.

In a sixth aspect, alone or in combination with one or more of the first through fifth aspects, process 600 includes transmitting an indication that interlayer separation precoding is applied to a downlink communication.

In a seventh aspect, alone or in combination with one or more of the first through sixth aspects, the interlayer separation precoding comprises SVD.

In an eighth aspect, alone or in combination with one or more of the first through seventh aspects, the requested periodicity is based at least in part on one or more of UE demodulator performance, UE decoder power consumption associated with one or more UE demodulators, channel Doppler spread, an SINR, an RSRP, a rank of a subsequent downlink communication, or overhead of the uplink reference signals at the requested periodicity.

In a ninth aspect, alone or in combination with one or more of the first through eighth aspects, receiving the requested periodicity is based at least in part on one or more of a change of a rank indicated for a subsequent downlink communication, a handover of the UE, a degradation of power efficiency in a demodulator or decoder of the UE, or a beam change.

In a tenth aspect, alone or in combination with one or more of the first through ninth aspects, receiving the requested periodicity comprises receiving the requested periodicity via one or more of an aperiodic report, a periodic report, a PUSCH, UCI, or a CSF report.

In an eleventh aspect, alone or in combination with one or more of the first through tenth aspects, the indication of the requested periodicity for uplink reference signals associated with improving UE power efficiency comprises one or more of an indication of a number of time domain resources between transmitting uplink reference signals, or a requested change to a periodicity of prior transmissions of uplink reference signals.

In a twelfth aspect, alone or in combination with one or more of the first through eleventh aspects, the periodicity of prior transmissions of uplink reference signals is based at least in part on an average time between consecutive prior transmissions of the prior transmissions of reference signals over a time period.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
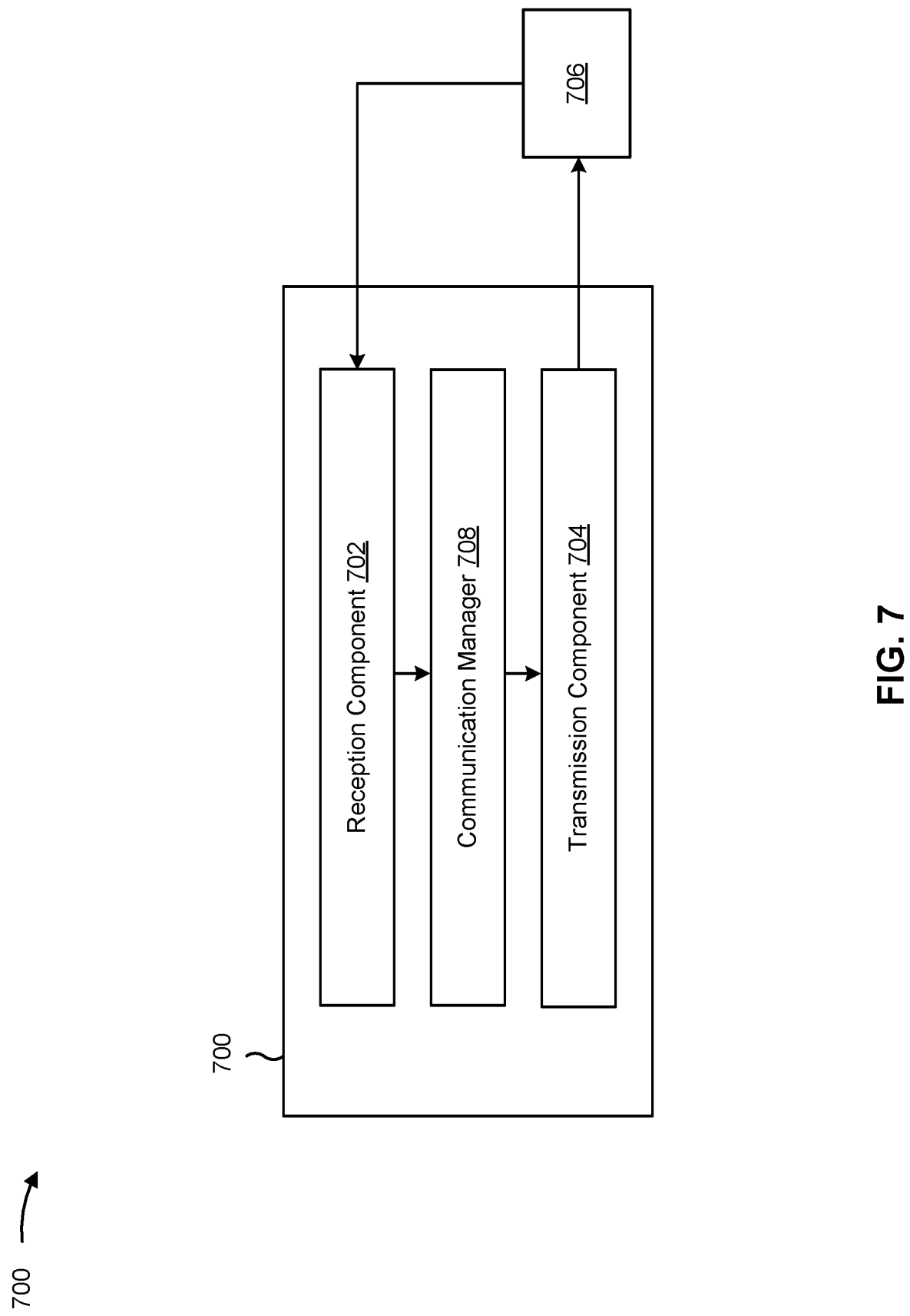
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 (e.g., the communication manager 140). The communication manager 708 may include one or more of a determination component, a demodulation component, and/or a modulation component, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The transmission component 704 may transmit an indication of a requested periodicity for uplink reference signals associated with improving UE power efficiency. The reception component 702 may receive an indication of resources for transmitting uplink reference signals based at least in part on the requested periodicity.

The transmission component 704 may transmit an indication of UE support for transmitting the indication of the requested periodicity for uplink reference signals associated with improving UE power efficiency.

The reception component 702 may receive an indication that interlayer separation precoding is applied to a downlink communication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
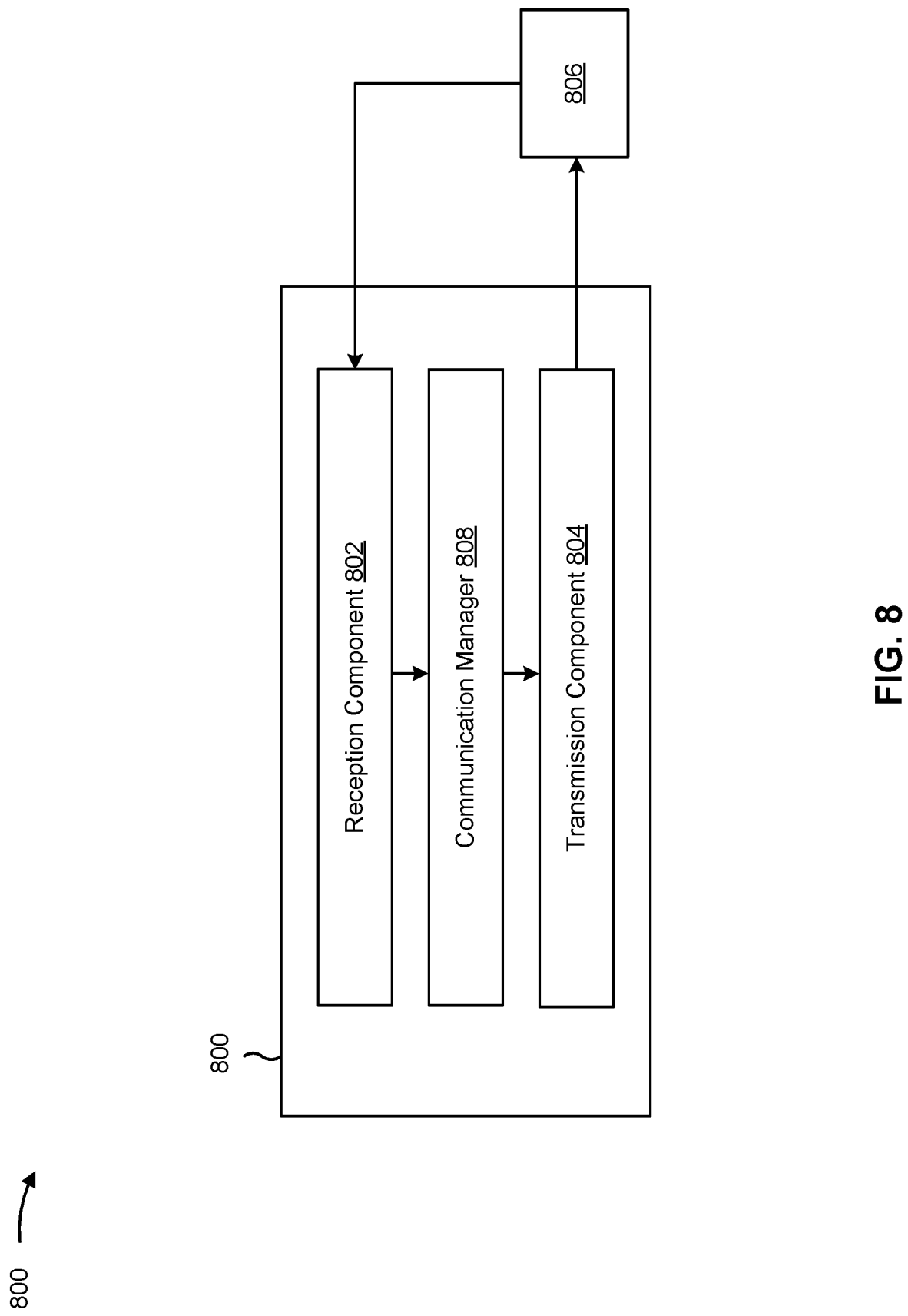

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., the communication manager 140). The communication manager 808 may include one or more of a determination component, a demodulation component, and/or a modulation component, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The reception component 802 may receive an indication of a requested periodicity for uplink reference signals associated with improving UE power efficiency. The transmission component 804 may transmit an indication of resources for transmitting uplink reference signals based at least in part on the requested periodicity.

The reception component 802 may receive an indication of UE support for transmitting the indication of the requested periodicity for uplink reference signals associated with improving UE power efficiency.

The transmission component 804 may transmit an indication that interlayer separation precoding is applied to a downlink communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting an indication of a requested periodicity for uplink reference signals associated with improving UE power efficiency; and receiving an indication of resources for transmitting uplink reference signals based at least in part on the requested periodicity.

Aspect 2: The method of Aspect 1, wherein the uplink reference signals comprise sounding reference signals (SRSs).

Aspect 3: The method of any of Aspects 1-2, wherein the UE power efficiency is based at least in part on power consumption and performance of a UE demodulator.

Aspect 4: The method of any of Aspects 1-3, wherein the UE power efficiency is based at least in part on power consumption and performance of a UE decoder.

Aspect 5: The method of any of Aspects 1-4, further comprising: transmitting an indication of UE support for transmitting the indication of the requested periodicity for uplink reference signals associated with improving UE power efficiency.

Aspect 6: The method of any of Aspects 1-5, wherein transmitting the indication of UE support for transmitting the indication of the requested periodicity for uplink reference signals associated with improving UE power efficiency comprises: transmitting the indication of UE support via a radio resource control message.

Aspect 7: The method of any of Aspects 1-6, further comprising: receiving an indication that interlayer separation precoding is applied to a downlink communication.

Aspect 8: The method of Aspect 7, wherein the interlayer separation precoding comprises singular value decomposition.

Aspect 9: The method of any of Aspects 1-8, wherein the requested periodicity is based at least in part on one or more of: UE demodulator performance, UE decoder power consumption associated with one or more UE demodulators, channel Doppler spread, a signal-to-interference-plus-noise ratio, a reference signal received power, a rank of a subsequent downlink communication, or overhead of the uplink reference signals at the requested periodicity.

Aspect 10: The method of any of Aspects 1-9, wherein transmitting the requested periodicity is based at least in part on one or more of: a change of a rank indicated for a subsequent downlink communication, a handover, a degradation of power efficiency in a demodulator or decoder, or a beam change.

Aspect 11: The method of any of Aspects 1-10, wherein transmitting the requested periodicity comprises transmitting the requested periodicity via one or more of: an aperiodic report, a periodic report, a physical uplink shared channel, uplink control information, or a channel state feedback report.

Aspect 12: The method of any of Aspects 1-11, wherein the indication of the requested periodicity for uplink reference signals associated with improving UE power efficiency comprises one or more of: an indication of a number of time domain resources between transmitting uplink reference signals, or a requested change to a periodicity of prior transmissions of uplink reference signals.

Aspect 13: The method of Aspect 12, wherein the periodicity of prior transmissions of uplink reference signals is based at least in part on an average time between sequential prior transmissions of the prior transmissions of reference signals over a time period.

Aspect 14: A method of wireless communication performed by a base station, comprising: receiving an indication of a requested periodicity for uplink reference signals associated with improving user equipment (UE) power efficiency; and transmitting an indication of resources for transmitting uplink reference signals based at least in part on the requested periodicity.

Aspect 15: The method of Aspect 14, wherein the uplink reference signals comprise sounding reference signals (SRSs).

Aspect 16: The method of any of Aspects 14-15, wherein the UE power efficiency is based at least in part on power consumption and performance of a UE demodulator.

Aspect 17: The method of any of Aspects 14-16, wherein the UE power efficiency is based at least in part on power consumption and performance of a UE decoder.

Aspect 18: The method of any of Aspects 14-17, further comprising: receiving an indication of UE support for transmitting the indication of the requested periodicity for uplink reference signals associated with improving UE power efficiency.

Aspect 19: The method of any of Aspects 14-18, wherein receiving the indication of UE support for transmitting the indication of the requested periodicity for uplink reference signals associated with improving UE power efficiency comprises: receiving the indication of UE support via a radio resource control message.

Aspect 20: The method of any of Aspects 14-19, further comprising: transmitting an indication that interlayer separation precoding is applied to a downlink communication.

Aspect 21: The method of Aspect 20, wherein the interlayer separation precoding comprises singular value decomposition.

Aspect 22: The method of any of Aspects 14-21, wherein the requested periodicity is based at least in part on one or more of: UE demodulator performance, UE decoder power consumption associated with one or more UE demodulators; channel Doppler spread, a signal-to-interference-plus-noise ratio, a reference signal received power, a rank of a subsequent downlink communication, or overhead of the uplink reference signals at the requested periodicity.

Aspect 23: The method of any of Aspects 14-22, wherein receiving the requested periodicity is based at least in part on one or more of: a change of a rank indicated for a subsequent downlink communication, a handover of the UE, a degradation of power efficiency in a demodulator or decoder of the UE, or a beam change.

Aspect 24: The method of any of Aspects 14-23, wherein receiving the requested periodicity comprises receiving the requested periodicity via one or more of: an aperiodic report, a periodic report, a physical uplink shared channel, uplink control information, or a channel state feedback report.

Aspect 25: The method of any of Aspects 14-24, wherein the indication of the requested periodicity for uplink reference signals associated with improving UE power efficiency comprises one or more of: an indication of a number of time domain resources between transmitting uplink reference signals, or a requested change to a periodicity of prior transmissions of uplink reference signals.

Aspect 26: The method of Aspect 25, wherein the periodicity of prior transmissions of uplink reference signals is based at least in part on an average time between sequential prior transmissions of the prior transmissions of reference signals over a time period.

Aspect 27: An apparatus for wireless communication at a device, comprising: a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit, from the UE to a network entity, an indication of a requested periodicity for uplink reference signals, the requested periodicity being associated with improving UE power efficiency; and
      receive, from the network entity, an indication of resources for transmitting the uplink reference signals, the indicated resources for transmitting the uplink reference signals being based at least in part on the requested periodicity transmitted to the network entity.

2. The UE of claim 1, wherein the uplink reference signals comprise sounding reference signals (SRSs).

3. The UE of claim 1, wherein the UE power efficiency is based at least in part on power consumption and performance of a UE demodulator.

4. The UE of claim 1, wherein the UE power efficiency is based at least in part on power consumption and performance of a UE decoder.

5. The UE of claim 1, wherein the one or more processors are further configured to:
   transmit an indication of UE support for transmitting the indication of the requested periodicity for uplink reference signals associated with improving the UE power efficiency.

6. The UE of claim 5, wherein the one or more processors, to transmit the indication of the UE support for transmitting the indication of the requested periodicity for uplink reference signals associated with improving the UE power efficiency, are configured to:
   transmit the indication of the UE support via a radio resource control message.

7. The UE of claim 1, wherein the one or more processors are further configured to:
   receive an indication that interlayer separation precoding is applied to a downlink communication.

8. The UE of claim 7, wherein the interlayer separation precoding comprises singular value decomposition.

9. The UE of claim 1, wherein the requested periodicity is based at least in part on one or more of:
   UE demodulator performance,
   UE decoder power consumption associated with one or more UE demodulators,
   channel Doppler spread,
   a signal-to-interference-plus-noise ratio,
   a reference signal received power,
   a rank of a subsequent downlink communication, or
   overhead of the uplink reference signals at the requested periodicity.

10. The UE of claim 1, wherein transmitting the requested periodicity is based at least in part on one or more of:
    a change of a rank indicated for a subsequent downlink communication,
    a handover,
    a degradation of power efficiency in a demodulator or decoder, or
    a beam change.

11. The UE of claim 1, wherein the one or more processors, to transmit the requested periodicity, are configured to transmit the requested periodicity via one or more of:
    an aperiodic report,
    a periodic report,
    a physical uplink shared channel,
    uplink control information, or
    a channel state feedback report.

12. The UE of claim 1, wherein the indication of the requested periodicity for uplink reference signals associated with improving the UE power efficiency comprises one or more of:
    an indication of a number of time domain resources between transmitting uplink reference signals, or
    a requested change to a periodicity of prior transmissions of uplink reference signals.

13. The UE of claim 12, wherein the periodicity of the prior transmissions of uplink reference signals is based at least in part on an average time between consecutive prior transmissions of the prior transmissions of reference signals over a time period.

14. A network entity for wireless communication, comprising:
    a memory; and
    one or more processors, coupled to the memory, configured to:
       receive, from a user equipment (UE), an indication of a requested periodicity for uplink reference signals, the requested periodicity being associated with improving UE power efficiency; and
       transmit, to the UE, an indication of resources for transmitting the uplink reference signals, the indicated resources for transmitting the uplink reference signals being based at least in part on the requested periodicity received by the network entity.

15. The network entity of claim 14, wherein the uplink reference signals comprise sounding reference signals (SRSs).

16. The network entity of claim 14, wherein the UE power efficiency is based at least in part on power consumption and performance of a UE demodulator.

17. The network entity of claim 14, wherein the UE power efficiency is based at least in part on power consumption and performance of a UE decoder.

18. The network entity of claim 14, wherein the one or more processors are further configured to:
receive an indication of UE support for transmitting the indication of the requested periodicity for uplink reference signals associated with improving the UE power efficiency.

19. The network entity of claim 18, wherein the one or more processors, to receive the indication of the UE support for transmitting the indication of the requested periodicity for uplink reference signals associated with improving the UE power efficiency, are configured to:
receive the indication of the UE support via a radio resource control message.

20. The network entity of claim 14, wherein the one or more processors are further configured to:
transmit an indication that interlayer separation precoding is applied to a downlink communication.

21. The network entity of claim 20, wherein the interlayer separation precoding comprises singular value decomposition.

22. The network entity of claim 14, wherein the requested periodicity is based at least in part on one or more of:
UE demodulator performance,
UE decoder power consumption associated with one or more UE demodulators,
channel Doppler spread,
a signal-to-interference-plus-noise ratio,
a reference signal received power,
a rank of a subsequent downlink communication, or
overhead of the uplink reference signals at the requested periodicity.

23. The network entity of claim 14, wherein receiving the requested periodicity is based at least in part on one or more of:
a change of a rank indicated for a subsequent downlink communication,
a handover of the UE,
a degradation of power efficiency in a demodulator or decoder of the UE, or
a beam change.

24. The network entity of claim 14, wherein the one or more processors, to receive the requested periodicity, are configured to receive the requested periodicity via one or more of:
an aperiodic report,
a periodic report,
a physical uplink shared channel,
uplink control information, or
a channel state feedback report.

25. The network entity of claim 14, wherein the indication of the requested periodicity for uplink reference signals associated with improving the UE power efficiency comprises one or more of:
an indication of a number of time domain resources between transmitting uplink reference signals, or
a requested change to a periodicity of prior transmissions of uplink reference signals.

26. The network entity of claim 25, wherein the periodicity of the prior transmissions of uplink reference signals is based at least in part on an average time between consecutive prior transmissions of the prior transmissions of reference signals over a time period.

27. A method of wireless communication performed by a user equipment (UE), comprising:
transmitting, from the UE to a network entity, an indication of a requested periodicity for uplink reference signals, the requested periodicity being associated with improving UE power efficiency; and
receiving, from the network entity, an indication of resources for transmitting the uplink reference signals, the indicated resources for transmitting the uplink reference signals being based at least in part on the requested periodicity transmitted to the network entity.

28. The method of claim 27, wherein the requested periodicity is based at least in part on one or more of:
UE demodulator performance,
UE decoder power consumption associated with one or more UE demodulators,
channel Doppler spread,
a signal-to-interference-plus-noise ratio,
a reference signal received power,
a rank of a subsequent downlink communication, or
overhead of the uplink reference signals at the requested periodicity.

29. A method of wireless communication performed by a network entity, comprising:
receiving, from a user equipment (UE), an indication of a requested periodicity for uplink reference signals, the requested periodicity being associated with improving UE power efficiency; and
transmitting, to the UE, an indication of resources for transmitting the uplink reference signals, the indicated resources for transmitting the uplink reference signals being based at least in part on the requested periodicity received from the UE.

30. The method of claim 29, wherein the requested periodicity is based at least in part on one or more of:
UE demodulator performance,
UE decoder power consumption associated with one or more UE demodulators,
channel Doppler spread,
a signal-to-interference-plus-noise ratio,
a reference signal received power,
a rank of a subsequent downlink communication, or
overhead of the uplink reference signals at the requested periodicity.

* * * * *